Patented Aug. 24, 1943

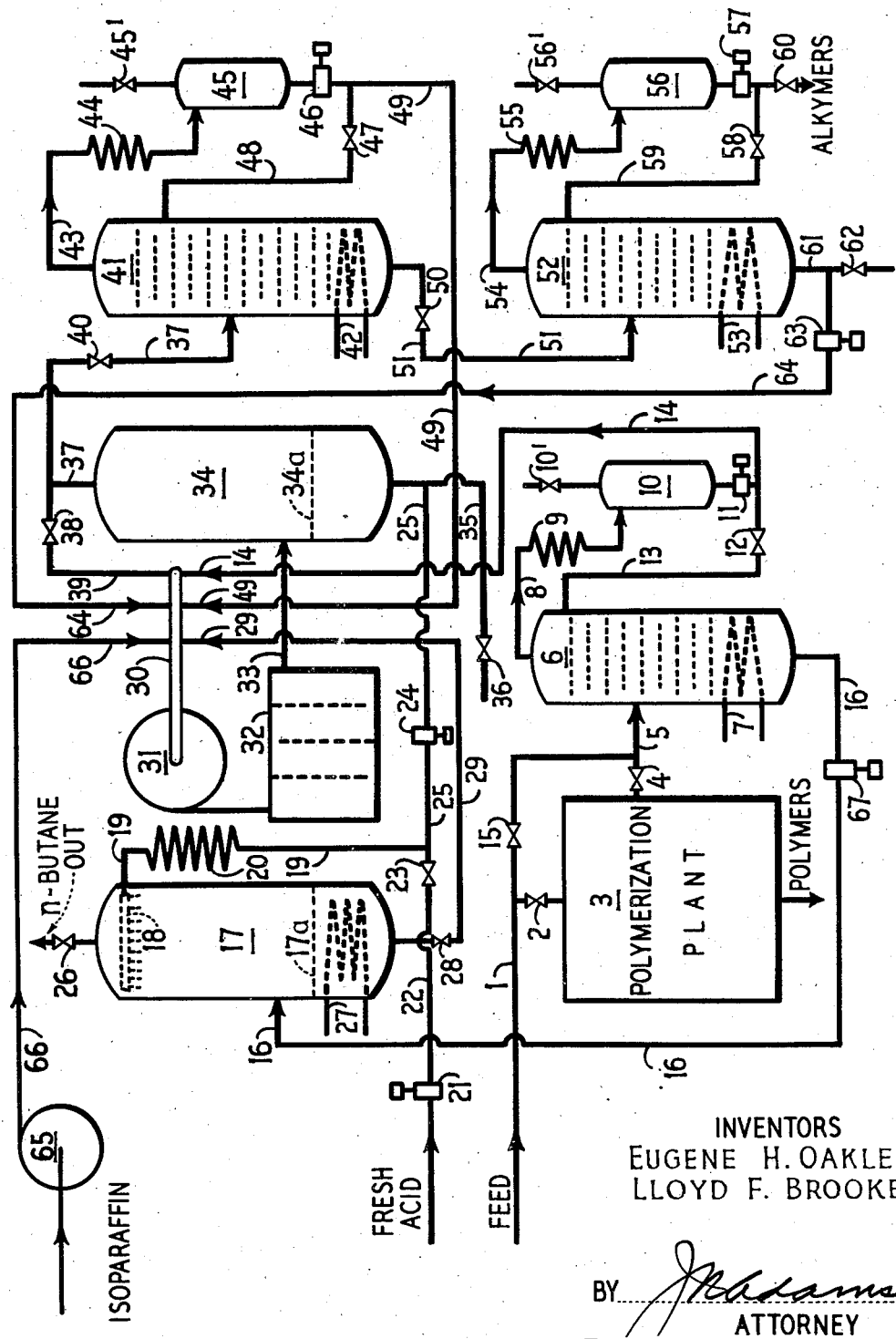

2,327,926

UNITED STATES PATENT OFFICE 2,327,926

REACTION OF HYDROCARBONS

Eugene H. Oakley, Richmond, and Lloyd F. Brooke, Berkeley, Calif., assignors to Standard Oil Company of California, San Francisco, Calif., a corporation of Delaware Application September 27, 1939, Serial No. 296,776

4 Claims. (Cl. 260—683.4)

This invention relates to an improved process for the alkylation of isoparaffins and, more particularly, to a process wherein said isoparaffins are alkylated by means of an alkylated acid for the production of isoparaffins suitable for use in liquid motor fuels of high antiknock value and for other uses.

It has previously been disclosed that the isoparaffinic hydrocarbons, such as isobutane and isopentane, may be caused to react with the normally gaseous olefins, such as propylene and the butenes, by means of liquid acid catalysts, such as concentrated sulfuric acid. The products of this reaction correspond in substantial part to the union of one molecule of isoparaffin with one molecule of olefin. This reaction is herein referred to as one of "alkylation" and the products as "alkymers." The alkymers produced from the isoparaffins containing less than six carbon atoms per molecule and the normally gaseous olefins have a high antiknock value and are therefore particularly suited for use in the preparation of aviation motor fuels.

In one method which has been proposed for effecting the foregoing alkylation reaction, the isoparaffin and olefin reactants are intimately contacted in the presence of the liquid sulfuric acid catalyst and the alkymers formed are separated from the catalyst and unreacted raw material by any appropriate means.

In another specific method advantage is taken of the discovery that the alkylation of an isoparaffin by an olefin, in the presence of a strong acid of the nature of sulfuric acid, is not a single reaction but is in fact the sum of two entirely distinct reactions which may therefore be separated and each effected under the conditions best suited to it with considerable improvement in operation and in the net result obtained.

The two separate reactions which result in the alkylation of an isoparaffin by an olefin in the presence of a strong acid of the sulfuric acid type are; first, the alkylation of the acid by the olefin to form what is for convenience referred to herein as an "alkylated acid" solution containing free acid, some of the alkyl acid ester of the acid, some polymers and apparently some as yet unidentified compound between the acid and the olefin or a polymer or other reaction product thereof, and second, the reaction of the alkylated acid solution thus produced with the isoparaffin to form an alkyl isoparaffin or alkymer and, with the isoparaffin in substantial excess, to release the acid approximately as it was before alkylation.

The maximum benefits to be derived from the above method of conducting the alkylation reaction in two separate stages are, however, largely dependent upon the specific manner in which and the specific conditions under which each stage is effected and the arrangement of the stages with respect to other necessary operations in a complete process for producing alkymers boiling in the range of motor fuels from readily available raw materials. Since many of the optimum conditions for the isoparaffin alkylating reaction are not widely different from those employed in the acid alkylating stage, it is, however, sometimes difficult, when alkylating the acid with a raw material containing both olefin and isoparaffin, to prevent entirely the alkylation of isoparaffin under the unfavorable conditions usually prevailing in the acid alkylation stage, and thereby producing alkymers of less value than those produced from the same raw material under the most favorable conditions.

It is an object of the present invention to provide an improved two-stage process for the production of alkymers having high antiknock value from isoparaffins and olefins boiling below the range of ordinary motor fuels.

It is another object of the present invention to provide an improved process for utilizing hydrocarbon mixtures comprising olefins, isoparaffins and normal paraffins for producing alkymers of the olefins with the isoparaffins by effecting the reaction in two separate stages through the agency of an acid alkylating medium.

It is a specific object of our invention to provide, in a method of producing alkymers from a mixture of isoparaffins and olefins by a two-stage reaction, an improved process wherein the alkylation of the isoparaffin is substantially confined to the second stage in which conditions most favorable to said alkylation may be maintained.

Another specific object of this invention is to provide an improved process for utilizing hydrocarbon mixtures comprising olefins, isoparaffins and normal paraffins for producing alkymers of the olefins with the isoparaffins by an improved two-stage method wherein the inert normal paraffins are eliminated with a minimum of distillation and the isoparaffin alkylation is positively confined to the second stage.

Other important objects of the invention will be apparent from the following description and the appended claims.

Convenient sources of olefins and isoparaffins in large volume for the production of alkymers of high antiknock value boiling in the range of aviation motor fuels are to be found in the mixtures of $C_5$ and lighter hydrocarbons produced during the cracking of petroleum oils or by the partial dehydrogenation of natural gas fractions. In such mixtures olefins, isoparaffins and normal paraffins usually occur together in proportions determined by the severity of the cracking or dehydrogenation treatment and the specific nature of the oil or natural gas fraction treated. Operation of the present invention in its preferred embodiment effects the separation and removal of these normal paraffins in an especially expeditious manner through a particular application of the two-stage method of alkylation referred to above.

A very convenient and widely available mixture containing isoparaffin for alkylation and olefin for effecting the alkylation is the $C_4$ or butane-butene fraction of the hydrocarbons resulting from the cracking of petroleum for the production of motor gasoline. Such a fraction will be employed in describing and illustrating the process of the present invention. The analysis of a typical butane-butene cut produced in the liquid phase cracking of a petroleum oil is as follows:

*Butane-butene cut*

|  | Per cent |
|---|---|
| $C_3$ and lighter | 3.1 |
| Isobutene | 17.5 |
| Normal butenes | 26.5 |
| Isobutane | 18.0 |
| Normal butane | 34.6 |
| $C_5$ and heavier | 0.3 |
|  | 100.0 |

In applying the above two-stage method of alkylation to such a mixture it has been proposed to effect the acid alkylation step by contacting the whole mixture with the acid under the appropriate conditions whereby the olefin is readily taken up by the acid leaving the mixture of normal and isoparaffins. However, in spite of special precautions that may be taken to prevent it, some alkylation of the isobutane is effected at the same time, even though the conditions are not particularly favorable to it, and, as pointed out above, the maximum possible benefits of the two-stage method have accordingly not been realized.

According to the process of the present invention a butane-butene fraction as produced, or after appropriate purification for the removal of nitrogen and/or sulfur-containing compounds, may be employed as the hydrocarbon raw material for the alkylation reaction. In a preferred embodiment of the invention such a purified fraction is first passed through a polymerization plant wherein the isobutene or the isobutene and a portion or all of the 1-butene is selectively removed and the remaining mixture of butene, isobutane and normal butane is then submitted to a fractional distillation whereby an overhead fraction, comprising isobutane, such of the 1-butene as may not have been polymerized and any $C_3$ compounds present, is separated from a bottoms fraction comprising normal butane, 2-butene and such minor quantity of $C_5$ compounds as may have been present in the original butane-butene cut. If the polymerization step is omitted, as may sometimes be desirable, the isobutene and 1-butene will be contained in the overhead fraction. The separation contemplated may be better understood by reference to the following table of approximate boiling points:

*Boiling points of $C_4$ hydrocarbons*

|  | °C. | °F. |
|---|---|---|
| Isobutane | −10.2 | 13.6 |
| Do | −6.0 | 21.2 |
| 1-butene | −5.0 | 23.0 |
| n-Butane | 0.6 | 33.0 |
| 2-butene (cis) | 1.0 | 33.8 |
| 2-butene (trans) | 2.5 | 36.5 |

The bottoms fraction, consisting essentially of n-butane and 2-butene, is passed to the first or acid alkylation stage wherein a strong acid of the sulfuric acid type, such as concentrated sulfuric acid, chlorosulfonic acid, mixed sulfuric and phosphoric acids or sulfuric and chlorosulfonic acids is alkylated by the 2-butene which is thereby separated from the normal butane. The alkylated acid after appropriate adjustment of concentration, temperature, etc., is then passed to the second or hydrocarbon alkylation stage wherein it is intimately contacted with the overhead fraction from the distillation step containing the isobutane to be alkylated. The alkyl components of the alkylated acid effect the alkylation of the isobutane and the original acid is liberated. When the overhead fraction contains olefin, as when the prepolymerization step is omitted, this olefin will also serve to alkylate a portion of the isobutane. The liberated acid, alkymer product and excess isobutane are then separated in appropriate manner and the alkymer product fractionated and otherwise treated as may be desired for the production of motor fuel.

The alkylation of sulfuric acid by butene takes place readily with acid of any strength above about 50% $H_2SO_4$ at ordinary atmospheric temperatures and the butene in either gaseous or liquid phase. The alkylation of isobutane by the alkylated acid, however, requires the isobutane to be in liquid phase, the contact between isobutane and the alkylated acid solution to be extremely good, the concentration of butyl acid sulfate and other alkyl components in the alkylated acid to be relatively low, usually of the order of about one percent, and the concentration of free sulfuric acid to be above about 86% by weight, the ratio of isobutane to total acid alkylation products to be high, usually well above ten to one, and the temperature to be closely controlled in order to obtain a satisfactory rate of reaction and to avoid undesirable side reactions.

The specific combinations of conditions best suited to each reaction are thus not the same and worthwhile economies and improvement in products may be obtained through practice of the two-stage process in which the reactions are carried out separately and each under the combination of conditions best suited to it. Even in the embodiment of the present invention in which no prepolymerization step is included or in which some of the isobutene and/or 1-butene is left unpolymerized and thus passes to the hydrocarbon alkylation zone wherein it alkylates isobutane directly in a single stage, the alkymer so produced is not a large part of the total alkymer product and hence the advantages of the two-stage method are still largely realized together with the advantageous separation of normal butane previously mentioned.

According to the process of the present invention the acid alkylation reaction is effected in any convenient manner such as by dispersing the acid in a body of the liquid hydrocarbon mixture containing the 2-butene and normal butane or by dispersing said mixture in a body of the acid or by bubbling said mixture as a gas through the liquid acid. Ordinarily it will be found most desirable for simplicity of operation and economy of equipment to effect the acid alkylation reaction according to the continuous countercurrent principle wherein the liquid hydrocarbon mixture of normal butane and 2-butene is caused to pass upwardly through a vessel of appropriate dimensions, such as a ten by thirty foot unpacked cylindrical drum while the liquid acid is dispersed from a suitable distributor placed near the top of said vessel, falls by gravity through the ascending hydrocarbon and is collected and drawn off from the bottom of the vessel. In such a method of operation the relation between the quantities of hydrocarbon and acid charged per unit of time may be varied so as to remove substantially all of the olefin during a single passage of the acid through any reasonable length column of hydrocarbon under the temperature conditions most suitable to the acid alkylation reaction and at the same time to build up the desired concentration of alkylation products in the alkylated acid.

The process of this invention may be better understood by referring to the figure of the attached drawing. According to our preferred method a hydrocarbon mixture containing olefins and both normal and isoparaffins, such as the above butane-butene cut, produced in a petroleum cracking process or by the partial dehydrogenation of a fraction from natural gas, with or without first having been treated for the removal of nitrogen and sulfur-containing compounds, is passed through line 1 and valve 2 to a polymerization plant 3 wherein the isobutene is selectively polymerized or the isobutene and a portion or all of the 1-butene are copolymerized by any known method. The remaining mixture containing the isobutane, normal butane, 2-butene and any 1-butene that was not polymerized, is led through valve 4 and line 5 to a fractionating column 6, equipped with a heating element 7, wherein it is separated into an overhead fraction containing the isobutane and residual 1-butene and a bottoms fraction containing the normal butane and 2-butene. In the event that it should be undesirable to convert a portion of the butenes to polymers, as just described, the whole feed may be charged directly to the butane still through line 1, valve 15 and line 5, in which event the overhead fraction will also contain isobutene.

The distillate from butane still 6 passes through line 8 to condenser 9 and receiving drum 10 from which uncondensed material may be vented through valve 10'. A portion of the liquid condensate from drum 10 is returned by pump 11 through valve 12 and line 13 to provide reflux liquid in the still while the remainder is passed through line 14 to the hydrocarbon alkylation zone presently to be described.

The bottoms fraction from butane still 6, which consists substantially of normal butane and 2-butene, is removed through line 16 and delivered by pump 67 to the acid alkylation zone 17 wherein the butene effects the alkylation of the acid entering through an appropriate distributor-header 18 and is thus separated from the normal butane which may then be discharged from the system through valve 26. The alkylated acid collects as a bottom layer which is indicated by 17a. Since the heat liberated in the acid alkylation reaction is sometimes quite considerable it will usually be found desirable to equip the acid alkylation zone 17 with a cooling coil 27 as indicated. Also in the interest of temperature control in the acid alkylation reaction, it may be desirable to equip the acid feed line 19 leading to the header 18 with a temperature regulator 20 by means of which to heat or cool the incoming acid, as may be desired. Fresh acid, usually of 95% or higher $H_2SO_4$ concentration, is fed to line 19 by pump 21 through line 22 and valve 23 while recycle acid may be supplied from pump 24 through line 25.

The alkylated acid collected at 17a is led from the acid alkylation zone through valve 28 and line 29 into the manifold 30 of the hydrocarbon alkylation zone wherein it is mixed with the overhead fraction from butane still 6, containing isobutane, which is introduced from line 14. Additional isobutane from an external source may be introduced by circulator 65 through line 66 to manifold 30 in order to maintain the desired high ratio of isobutane to acid alkylation products previously mentioned. The mixture of hydrocarbon and acid produced in manifold 30 is led directly into contactor 31 which may be of any appropriate construction to give intimate contact between an aqueous and an oil phase. The reaction mixture from contactor 31 may be passed through a further contacting zone 32, in order to provide ample time for completion of the hydrocarbon alkylation reaction, and thence through line 33 to separator 34 wherein the liberated acid is collected as indicated at 34a and the hydrocarbon layer containing alkymer product and a substantial quantity of unreacted isobutane is led through line 37 and valve 40 to an alkymer stabilizer 41 or, when desired, a portion of it may be returned through valve 38 and line 39 to manifold 30 for further augmenting the supply of isobutane therein. The liberated acid collected at 34a may be returned to the acid alkylation zone 17 by line 25 and pump 24, as previously mentioned, or removed from the system through line 35 and valve 36, when desired.

In alkymer stabilizer 41, equipped with heating element 42, the alkymer product is separated from excess isobutane which passes overhead through line 43 and condenser 44 to receiving drum 45 while the alkymers pass through valve 50 and line 51 to alkymer still 52. A portion of the isobutane collected in drum 45 may be returned by pump 46 through valve 47 and line 48 to stabilizer 41 while the remainder is returned through line 49 to manifold 30. The alkymer product is distilled in alkymer still 52, equipped with heating element 53, to produce an overhead fraction of any desired end point which passes through line 54 and condenser 55 to receiving drum 56 and a bottoms fraction which is removed through line 61 and discarded through valve 62 or, preferably, returned by pump 63 through line 64 to manifold 30. Alkymer distillate from drum 56 is removed by pump 57 and may be returned through valve 58 and line 59 to provide reflux liquid in the still 52 or removed from the system through valve 60, as desired.

Although the best method of applying the process of this invention has been explained and illustrated by reference to a specific butane-butene cut, the process of the invention is, nevertheless, useful for manufacturing high antiknock motor fuel hydrocarbons from any mixture of relatively light hydrocarbons containing isoparaffin having less than six carbon atoms per molecule, a corresponding normal paraffin, and olefins of corresponding or lower molecular, weight wherein a separation by fractional distillation may be readily effected between the isoparaffin, on the one hand, and, on the other hand, the normal paraffin and any olefin having a boiling point so close to that of the normal paraffin that it is practically impossible to separate them by fractionation, because with such a mixture of hydrocarbons the advantages of this invention resulting from confining the hydrocarbon alkylation to the second stage and from the complete separation of the normal paraffin from any olefin having a boiling point too close to that of the normal paraffin for ready separation by distillation can be obtained. Likewise, while sulfuric acid has been mentioned as the alkylation catalyst in the foregoing description, other liquid strong acid alkylation catalysts of the sulfuric acid type, of which several have been given above, may be employed.

A particular feature of the process of this invention which may be emphasized in summary is the position of the butane still ahead of the acid alkylation stage whereby isobutane is separated from admixture with the butenes to be used in alkylating the acid and hence any possibility of forming undesirable alkymers during the acid alkylating reaction is positively precluded and the quality of the ultimate alkymer product is thus improved.

When isobutene and 1-butene are not removed or not entirely removed by polymerization and thus accompany the isobutane to the hydrocarbon alkylation zone and are therein responsible for the direct catalytic alkylation of a portion of the isobutane, the advantages of the two-stage process are nevertheless retained to a substantial degree. Also by effecting the elimination of normal butane at a point in the system ahead of the hydrocarbon alkylation zone in which it is desirable to maintain a high proportion of isobutane the butane still required is substantially smaller than would otherwise be the case and a corresponding economy is effected both in original equipment and in operating cost. The simple and complete separation of normal butane from 2-butene in the acid alkylation zone is also worthy of note since it would be impractical to effect this separation by distillation.

Having now fully described and explained an improved process for effecting the alkylation of an isoparaffin by an olefin in two entirely separate stages, we claim:

1. Process of producing high antiknock motor fuel hydrocarbons from a butane-butene hydrocarbon fraction containing isobutane, isobutene, normal butane, 1-butene and 2-butene which comprises selectively polymerizing said isobutene, separating isobutene polymers thus produced from C4 hydrocarbons, fractionally distilling said C4 hydrocarbons to produce an overhead fraction containing isobutane and a bottoms fraction containing 2-butene, reacting said bottoms fraction with an acid alkylation catalyst of the sulfuric acid type thereby producing an alkylated acid solution containing butyl acid ester and alkylating said overhead fraction containing isobutane with said alkylated acid solution containing butyl acid ester.

2. Process of producing high antiknock motor fuel hydrocarbons from a butane-butene cut containing isobutane, isobutene, normal butane, 1-butene and 2-butene which comprises selectively polymerizing said isobutene and removing the polymers from unpolymerized C4 hydrocarbons, fractionally distilling said unpolymerized C4 hydrocarbons to produce an overhead fraction containing isobutane and some 1-butene and a bottoms fraction containing normal butane, 2-butene and some 1-butene, reacting said bottoms fraction with a sulfuric acid alkylation catalyst containing above about 86% by weight $H_2SO_4$ and thereby forming an alkylated sulfuric acid solution containing butyl acid sulfate and alkylating said overhead fraction containing isobutane with said alkylated sulfuric acid solution containing butyl acid sulfate at a temperature below about 100° F.

3. Process of producing high antiknock motor fuel hydrocarbons from a butane-butene cut containing isobutane, isobutene, normal butane, 1-butene and 2-butene which comprises fractionally distilling said cut to produce an overhead fraction containing isobutane and a bottoms fraction containing normal butene and normal butane, contacting said bottoms fraction with sulfuric acid containing above about 86% by weight $H_2SO_4$ in an acid alkylation zone thereby forming an alkylated acid solution containing butyl acid sulfate by reaction of said normal butene with said sulfuric acid and thus separating the normal butene from said normal butane, said sulfuric acid being present in excess of that required to react with said normal butene, passing said alkylated acid solution to a hydrocarbon alkylation zone separate from said acid alkylation zone, passing said overhead fraction containing isobutane to said hydrocarbon alkylation zone, intimately contacting said isobutane with said alkylated acid solution in said hydrocarbon alkylation zone, passing the resulting reaction mixture to a separating zone wherein sulfuric acid is separated from hydrocarbons, returning a portion of said separated hydrocarbons to said alkylation zone, returning a portion of said separated sulfuric acid to said acid alkylation zone, passing the remaining portion of said hydrocarbons separated from said sulfuric acid in said separating zone to a stabilizing zone wherein isobutane is distilled from alkymer product, condensing said isobutane and returning a portion thereof to said hydrocarbon alkylation zone, passing said alkymer product from said stabilizing zone to an alkymer product still and therein distilling from said alkymer product a desired motor fuel fraction and returning the remainder of said alkymer product to said hydrocarbon alkylation zone.

4. Process of making high antiknock motor fuel hydrocarbons from a mixture of relatively light hydrocarbons containing isobutane, isobutene, 1-butene, normal butane and 2-butene, which comprises removing isobutene and 1-butene from said mixture by subjecting said mixture to polymerizing conditions, separating normal butane and 2-butene from the remaining mixture by fractional distillation, absorbing 2-butene in an alkylation catalyst thus separating 2-butene from normal butane and forming an alkylated catalyst solution, and alkylating a portion of said isobutane with said alkylated catalyst solution thus forming high antiknock motor fuel hydrocarbons.

EUGENE H. OAKLEY.
LLOYD F. BROOKE.